United States Patent
Dabak et al.

(12) 
(10) Patent No.: US 6,345,069 B1
(45) Date of Patent: Feb. 5, 2002

(54) SIMPLIFIED CELL SEARCH SCHEME FOR FIRST AND SECOND STAGE

(75) Inventors: Anand G. Dabak, Richardson; Srinath Hosur; Sundararajan Sriram, both of Dallas, all of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/217,759

(22) Filed: Dec. 21, 1998

Related U.S. Application Data

(60) Provisional application No. 60/104,522, filed on Oct. 16, 1998.

(51) Int. Cl.$^7$ .............................. A61F 2/06; H04L 27/30
(52) U.S. Cl. ....................................... 375/152; 375/340
(58) Field of Search ............................... 375/130, 136, 375/140, 147, 152, 316, 340; 370/320, 342; 359/136

(56) References Cited

U.S. PATENT DOCUMENTS

| | | | |
|---|---|---|---|
| 5,228,054 A | | 7/1993 | Rueth et al. |
| 5,760,941 A | * | 6/1998 | Young et al. ................ 359/181 |
| 5,835,590 A | * | 11/1998 | Miller .......................... 380/266 |
| 5,995,539 A | * | 11/1999 | Miller .......................... 375/222 |
| 6,236,483 B1 | * | 5/2001 | Dutt et al. .................... 359/136 |
| 6,263,017 B1 | * | 7/2001 | Miller .......................... 375/222 |

OTHER PUBLICATIONS

"Report On FPLMTS Radio Transmission Technology Special Group", (Round 2 Activity Report), Association of Radio Industries and Business (ARIB), FPLMTS Study Committee, Draft Version E1.1, Jan. 10, 1997, 224 pages.
"Proposed Wideband CDMA (W–CDMA)", Association of Radio Industries and Businesses (ARIB), Japan, 01/97, 213 pages.
IMT–2000 Study Committee, Air–Interface WG, SWG2; dated Oct. 5, 1998.
ETSI STC SMG2 UMTS Layer 1 Expert Group, Oct. 14–16, 1998, Stockholm, Sweden.

* cited by examiner

*Primary Examiner*—Stephen Chin
*Assistant Examiner*—Lenny Jiang
(74) *Attorney, Agent, or Firm*—Robert N. Rountree; Wade James Brady, III; Frederick J. Telecky, Jr.

(57) ABSTRACT

A circuit for detecting a signal is designed with a first serial circuit coupled to receive an input signal in response to a clock signal. The first serial circuit (121) has N taps (142–146) arranged to produce a respective plurality of first tap signals from the input signal (111). A first logic circuit (130, 132, 134, 148) is coupled to receive the plurality of first tap signals and one of N predetermined signals and the complement of N predetermined signals. The first logic circuit produces a first output signal (150) in response to the clock signal, the plurality of first tap signals and the one of N predetermined signals and the complement of N predetermined signals. A second serial circuit coupled to receive the first output signal. The second serial circuit has M taps (150, 172–184) arranged to produce a respective plurality of second tap signals from the first output signal, wherein a ratio of N/M is no greater than four. A second logic circuit (186) is coupled to receive one of a true and a complement of each of the plurality of second tap signals. The second logic circuit produces a second output signal (188) in response to the one of a true and a complement of each of the plurality of second tap signals.

37 Claims, 5 Drawing Sheets

SIMPLIFIED CELL SEARCH SCHEME FOR FIRST AND SECOND STAGE

This amendment claims priority under 35 USC § 119(e)(1) of provisional application No. 60/104,522, filed Oct. 16, 1998.

FIELD OF THE INVENTION

This invention relates to wideband code division multiple access (WCDMA) for a communication system and more particularly to a simplified cell search scheme for WCDMA.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in U.S. patent application Ser. No. 90/067,594, entitled Spread-Spectrum Telephony with Accelerated Code Acquisition, filed Apr. 27, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within the cell or within range. The frames may propagate in a discontinuous transmission (DTX) mode within the cell. For voice traffic, transmission of user data occurs when the user speaks, but no data symbol transmission occurs when the user is silent. Similarly for packet data, the user data may be transmitted only when packets are ready to be sent. The frames include pilot symbols as well as other control symbols such as transmit power control (TPC) symbols and rate information (RI) symbols. These control symbols include multiple bits otherwise known as chips to distinguish them from data bits. The chip transmission time (Tc), therefore, is equal to the symbol time rate (T) divided by the number of chips in the symbol (N). This number of chips in the symbol is the spreading factor.

A WCDMA mobile communication system must initially acquire a signal from a remote base station to establish communications within a cell. This initial acquisition, however, is complicated by the presence of multiple unrelated signals from the base station that are intended for other mobile systems within the cell as well as signals from other base stations. Moreover, normal signals from each base station are modulated by a common scrambling code or long code that distinguishes it from adjacent base stations. The duration of these long codes would normally inhibit rapid signal acquisition. The base station, therefore, continually transmits a special signal at 16 KSPS on a perch channel, much like a beacon, to facilitate this initial acquisition. The perch channel format includes a frame with sixteen time slots, each having a duration of 0.625 milliseconds. Each time slot includes four common pilot symbols, four transport channel data symbols and two search code symbols. These search code symbols include a first search code (FSC) symbol and a second search code (SSC) symbol transmitted in parallel. These search code symbols are not modulated by the long code, so a mobile receiver need not examine each of 512 long codes for the duration of each code to acquire a signal. Rather, spreading modulation of the search code symbols of the perch channel is limited to a 256 chip Gold sequence.

Referring to FIG. 3A, there is a simplified block diagram of a transmitter of the prior art for transmitting first and second search codes. Circuits 302 and 310 each produce a 256 cycle Hadamard sequence. Both sequences are modulated by a complement of a 64-cycle Gold sequence and three 64-cycle Gold sequences, thereby producing a 256-chip FSC symbol in parallel with a 256-chip SSC symbol. The block diagram of FIG. 3B illustrates a circuit of the prior art for detecting the FSC symbol of FIG. 3A. The circuit receives the FSC symbol as an input signal on lead 311. The signal is periodically sampled in response to a clock signal by serial register 321. The circuit has 64 taps that are multiplied with respective pseudo-noise (PN) signals to produce 64 output signals. Adder 348 adds these 64 output signals and produces a sequence of output signals at terminal 350. These output signals are loaded into serial register 391. Signal samples from register taps 350–376 produce sample outputs that adder 386 sums to produce a match signal MAT at lead 388. A coincidence of each chip of the received FSC symbol with the Gold PN sequence at zero time shift (FIG. 3C) results in a high correlation of all 256 chips. Any shift in the received chips of the FSC symbol with respect to the Gold PN sequence, however, results in a severely degraded correlation having a maximum peak of 70 chips. Thus, the high correlation indicates a match or acquisition of the FSC symbol from a base station.

Several problems with the circuit of FIG. 3B render this solution less than ideal. First, the 64-chip accumulator requires 64 taps and 64 logic gates. Second, the logic gates produce 64 output signals that must be combined by a 64-input adder at the chip rate multiplied by the oversampling rate. Finally, these circuit elements require extensive layout area and increase power consumption. Both latter considerations are especially disadvantageous for mobile communications systems.

SUMMARY OF THE INVENTION

These problems are resolved by a first serial circuit coupled to receive an input signal in response to a clock signal. The first serial circuit has N taps arranged to produce a respective plurality of first tap signals from the input signal. A first logic circuit is coupled to receive the plurality of first tap signals and one of N predetermined signals and the complement of N predetermined signals. The first logic circuit produces a first output signal in response to the clock signal, the plurality of first tap signals and the one of N predetermined signals and the complement of N predetermined signals. A second serial circuit coupled to receive the first output signal. The second serial circuit has M taps arranged to produce a respective plurality of second tap signals from the first output signal, wherein a ratio of N/M is no greater than four. A second logic circuit is coupled to receive one of a true and a complement of each of the plurality of second tap signals. The second logic circuit produces a second output signal in response to the one of a true and a complement of each of the plurality of second tap signals.

The present invention provides synchronization capability that is comparable to circuits of the prior art. Circuit complexity including gate count and signal taps as well as power consumption are greatly reduced.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1A:
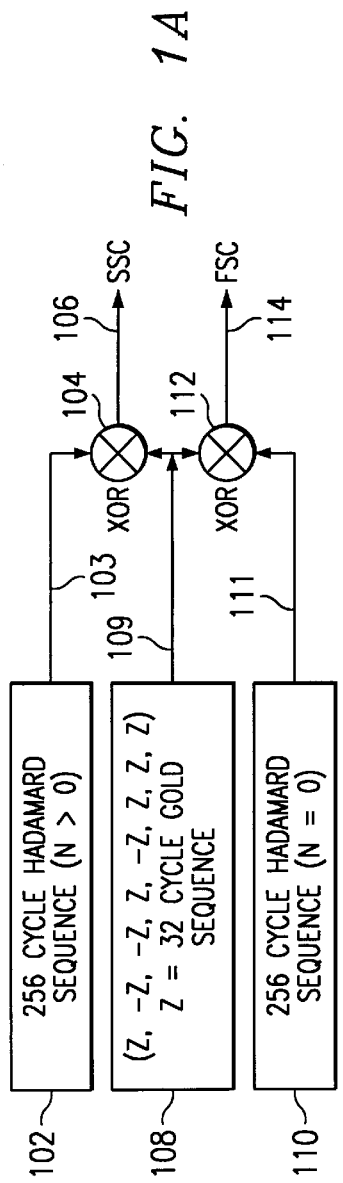
FIG. 1A is a simplified block diagram of a transmitter for transmitting first and second search codes according to a first embodiment of the present invention.

Referring to FIG. 1A, there is a simplified block diagram of a transmitter for transmitting first and second search codes according to the present invention. Circuits 102 and 110 each produce a 256 cycle Hadamard sequence. Both sequences are selectively modulated by either a true or a complement of a 32-cycle Gold sequence Z. The true or complement state of each 32-cycle Gold sequence group is indicated in the Gold sequence generator circuit 108 as (Z,−Z,−Z,Z,−Z,Z,Z,Z). In general, this may be represented as a 256-bit sequence of M (8) groups of N (32) logical signals. Exclusive OR (XOR) circuits 112 and 104 modulate respective 256-cycle sequences at leads 111 and 103, respectively, thereby producing a 256-chip first search code (FSC) symbol in parallel with a 256-chip second search code (SSC) symbol. These FSC and SSC symbols are match signals transmitted by a base station to facilitate signal acquisition by a mobile remote station.

Figure 1B:
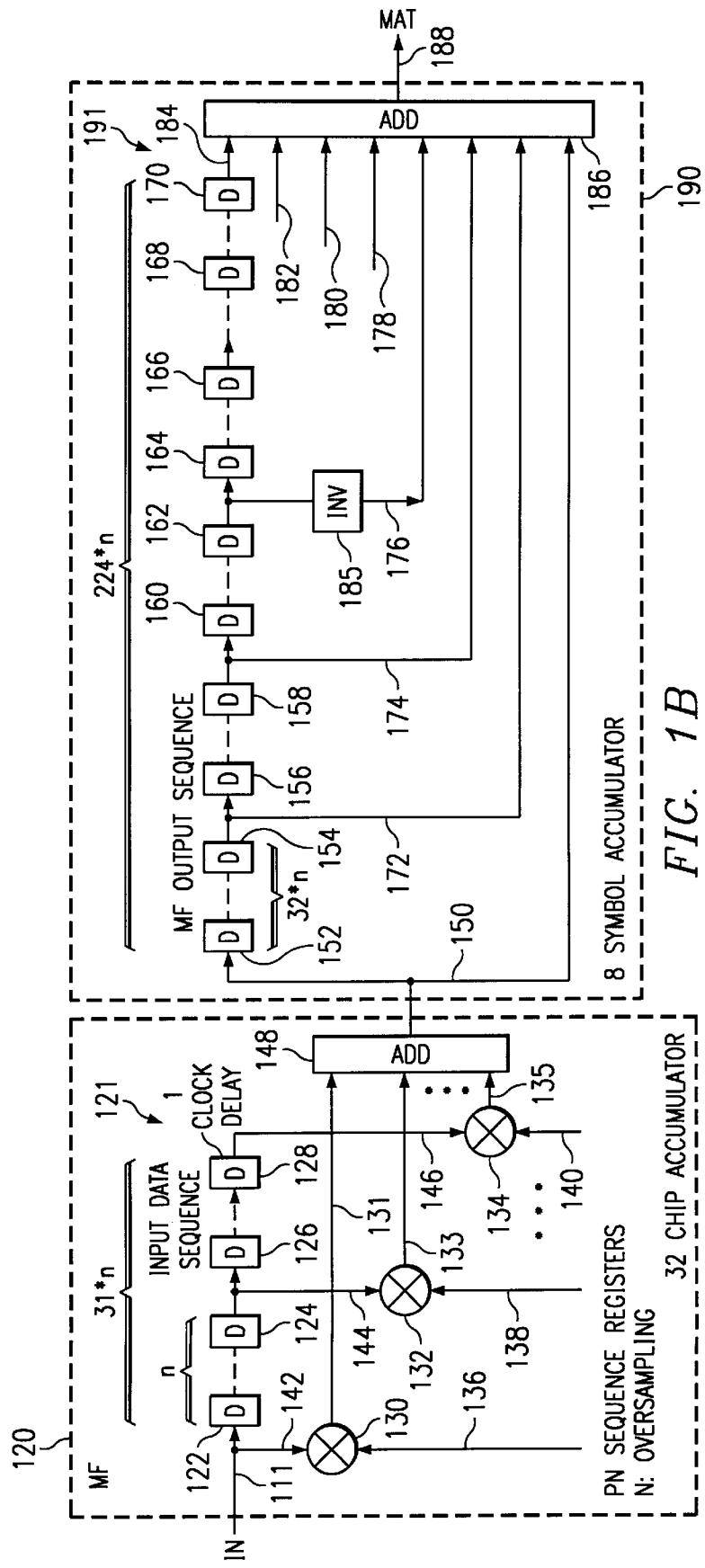
FIG. 1B is a block diagram of a circuit for detecting the first search code of FIG. 1A according the first embodiment of the present invention.

Turning now to FIG. 1B, there is a block diagram of a detection circuit of the present invention for detecting the FSC symbol of FIG. 1A. The circuit receives the FSC symbol as an input signal IN on lead 111. The signal is periodically sampled in response to a clock signal by serial register 121. The sample rate is preferably greater than the chip rate by an oversampling rate n. An oversampling rate of preferably 2 offers an acceptable compromise between accuracy, circuit complexity and power consumption. Serial register 121, therefore, has 31*n stages for storing each successive sample of input signal IN. Serial register 121 has 32 (N) taps 142–146 that produce 32 respective parallel tap signals. Each of the tap signals is separated by n stages or samples, where n is one when there is no oversampling. A logic circuit including 32 XOR circuits (130, 132, 134) receives the respective tap signals as well as 32 respective pseudo-noise (PN) signals to produce 32 output signals (131, 133, 135). This PN sequence matches the transmitted sequence from circuit 108 and is preferably a Gold sequence. Adder circuit 148 receives the 32 output signals and adds them to produce a sequence of output signals at terminal 150 corresponding to the oversampling rate n.

Figure 3A:
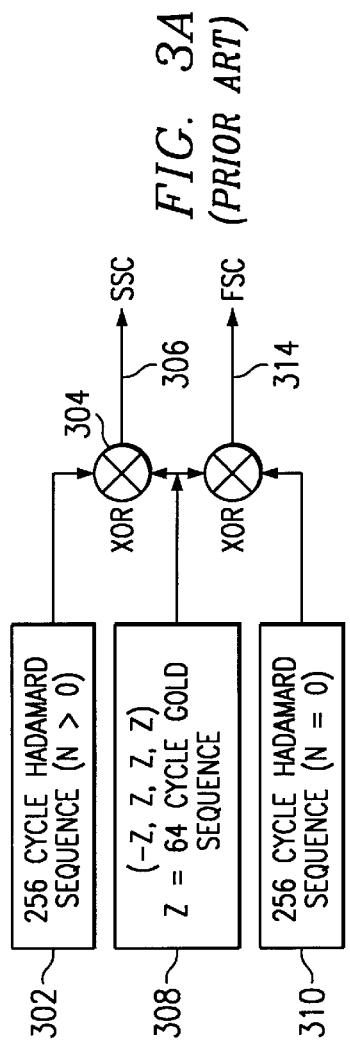
FIG. 3A is a simplified block diagram of a transmitter of the prior art for transmitting first and second search codes.
Figure 3B:
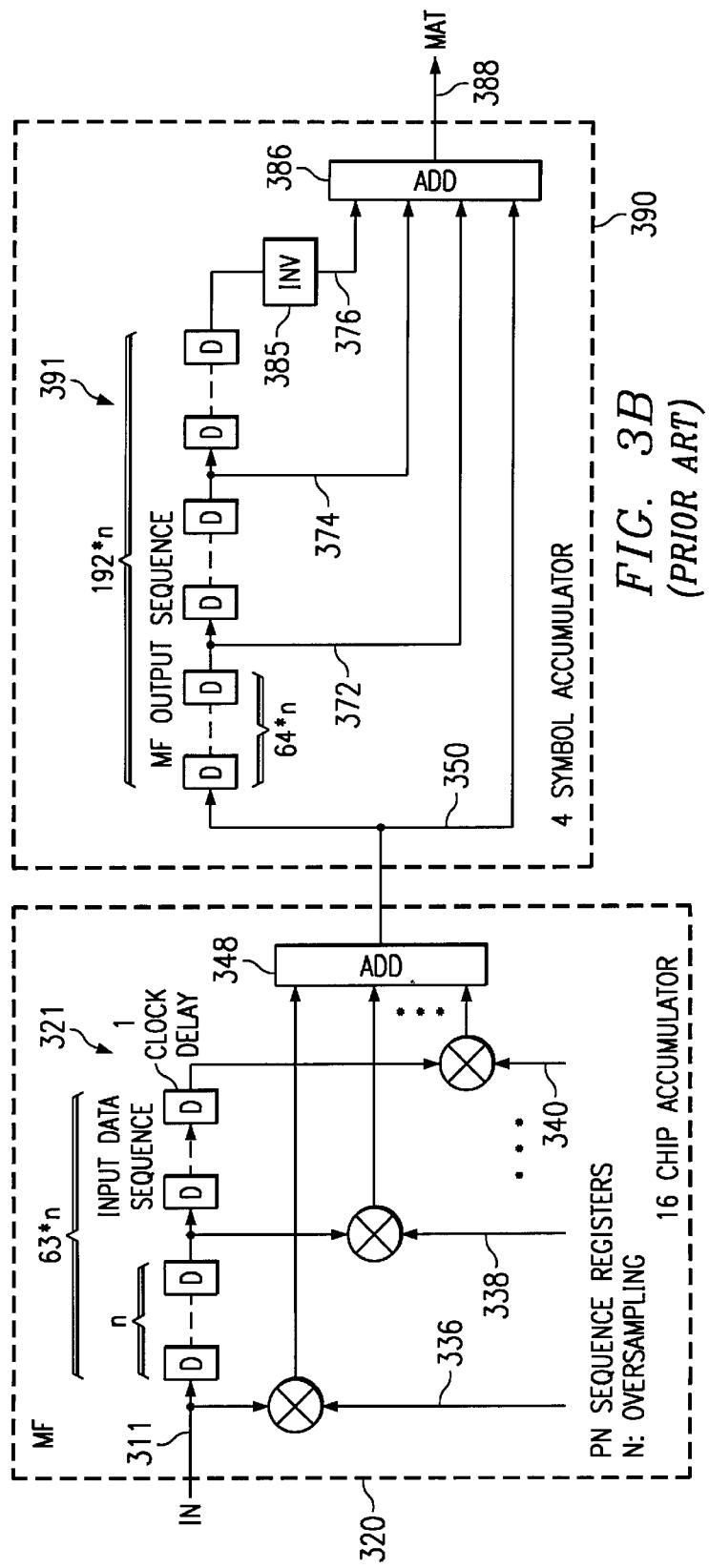
FIG. 3B is a block diagram of a circuit of the prior art for detecting the first search code of FIG. 3A.
Figure 4:
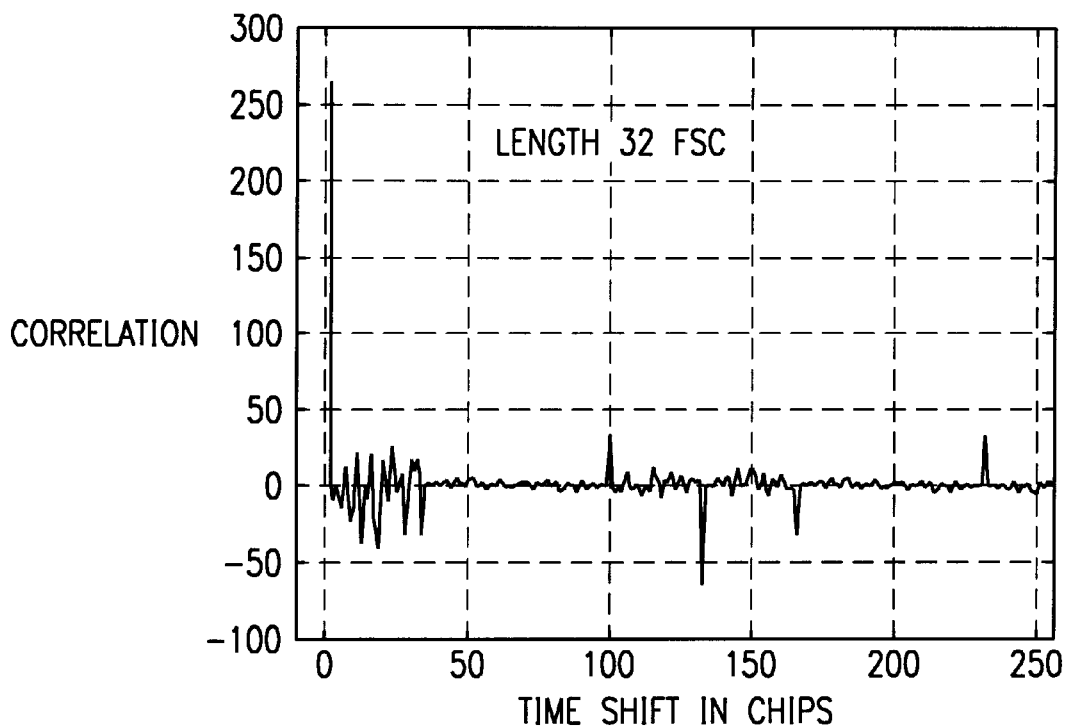
FIG. 4 is a correlation diagram for the detection circuit of FIG. 1B.

These output signals on lead 150 are loaded into serial register 191. Serial register 191 includes 224*n stages and 8 (M) taps (150, 172–182). Signal samples from the taps of serial register 191 produce 8 sample outputs in parallel. These 8 sample output signals are selectively inverted to match the sequence inversions of circuit 108 (FIG. 1A). Inverter 185, for example, corresponds to the fifth inverted symbol in the sequence of circuit 108. Adder 186 receives the true or complement of these tap signals and sums them to produce a match signal MAT at lead 188. A coincidence of each chip of the received FSC symbol with the Gold PN sequence at zero time shift (FIG. 4) results in a high correlation of all 256 chips. Any shift in the received chips of the FSC symbol with respect to the Gold PN sequence, however, results in a severely degraded correlation having a maximum peak of less than 50 chips. Thus, the high correlation indicates a match or acquisition of the FSC symbol from a base station. Both the high correlation match and the low correlation rejection of the present invention compare favorably with the detection circuit of the prior art (FIG. 3B). The present invention, however, provides a significant advantage of circuit simplicity and corresponding power reduction over the prior art. The instant embodiment of the present invention requires only 32 taps and 32 corresponding XOR circuits for the 32-chip accumulator circuit 120. Furthermore, the adder circuit 148 sums only 32 signals to produce the output signal on lead 150. By way of comparison, the prior art 64-chip accumulator of FIG. 3B requires 64 taps and 64 corresponding XOR circuits. The adder must add 64 input signals. Thus, the present invention provides a substantial reduction in layout area, logic gates and parasitic capacitance. The additional logic gates and corresponding parasitic capacitance consume significantly more power than the present invention.

Figure 2A:
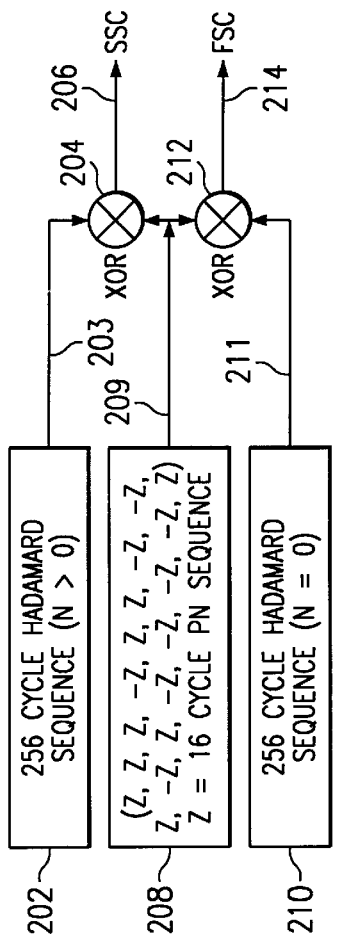
FIG. 2A is a simplified block diagram of a transmitter for transmitting first and second search codes according to a second embodiment of the present invention.

Turning now to FIG. 2A, there is a simplified block diagram of a transmitter for transmitting first and second search codes according to another embodiment of the present invention. Circuits 202 and 210 each produce a 256 cycle Hadamard sequence as previously described. Both sequences, however, are selectively modulated by either a true or a complement of a 16-cycle Gold sequence Z. The true or complement state of each 16-cycle Gold sequence group is indicated in the Gold sequence generator circuit 208 as (Z,Z,Z,−Z,Z,Z,−Z,−Z,Z,−Z,Z,−Z,−Z,−Z,−Z,Z). In general, this may be represented as a 256-bit sequence of M (16) groups of N (16) logical signals. The XOR circuits 212 and 204 modulate respective 256-cycle sequences at leads 211 and 203, respectively, thereby producing a 256-chip first search code (FSC) symbol in parallel with a 256-chip second search code (SSC) symbol.

Figure 2B:
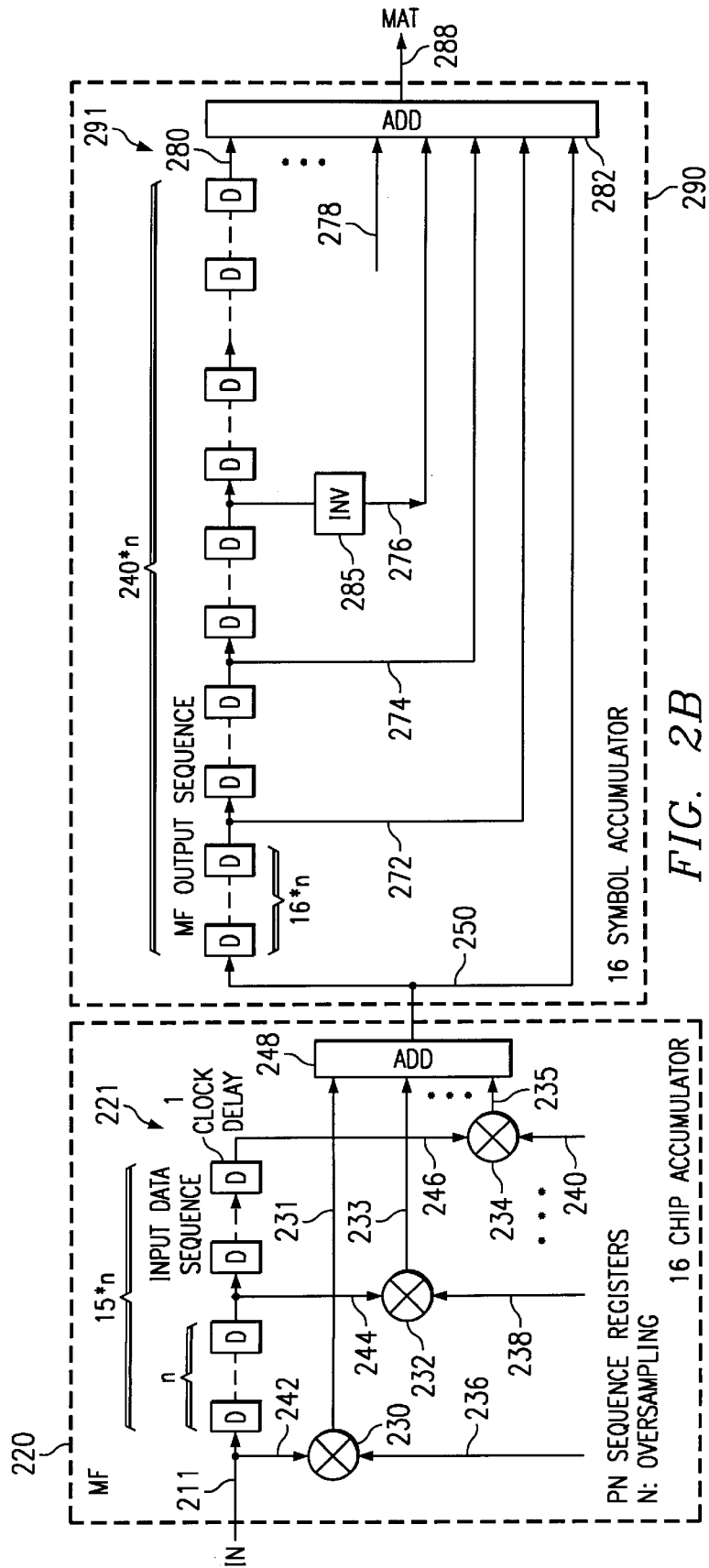
FIG. 2B is a block diagram of a circuit for detecting the first search code of FIG. 2A according the second embodiment of the present invention.

The detection circuit of FIG. 2B, receives the FSC symbol from the transmitter of FIG. 2A as an input signal IN on lead 211. The signal is periodically sampled in response to a clock signal by serial register 221 at an oversampling rate n. Serial register 221, therefore, has 15*n stages for storing each successive sample of input signal IN. Serial register 221 has 16 (N) taps 242–246 that produce 16 respective parallel tap signals. A logic circuit including 16 XOR circuits (230, 232, 234) receives the respective tap signals as well as 16 respective pseudo-noise (PN) signals to produce 16 output signals (231, 233, 235). This PN sequence matches the transmitted sequence from circuit 208 and is preferably a Gold sequence. Adder circuit 248 receives the 16 output signals and adds them to produce a sequence of output signals at terminal 250 corresponding to the oversampling rate n.

Figure 5:
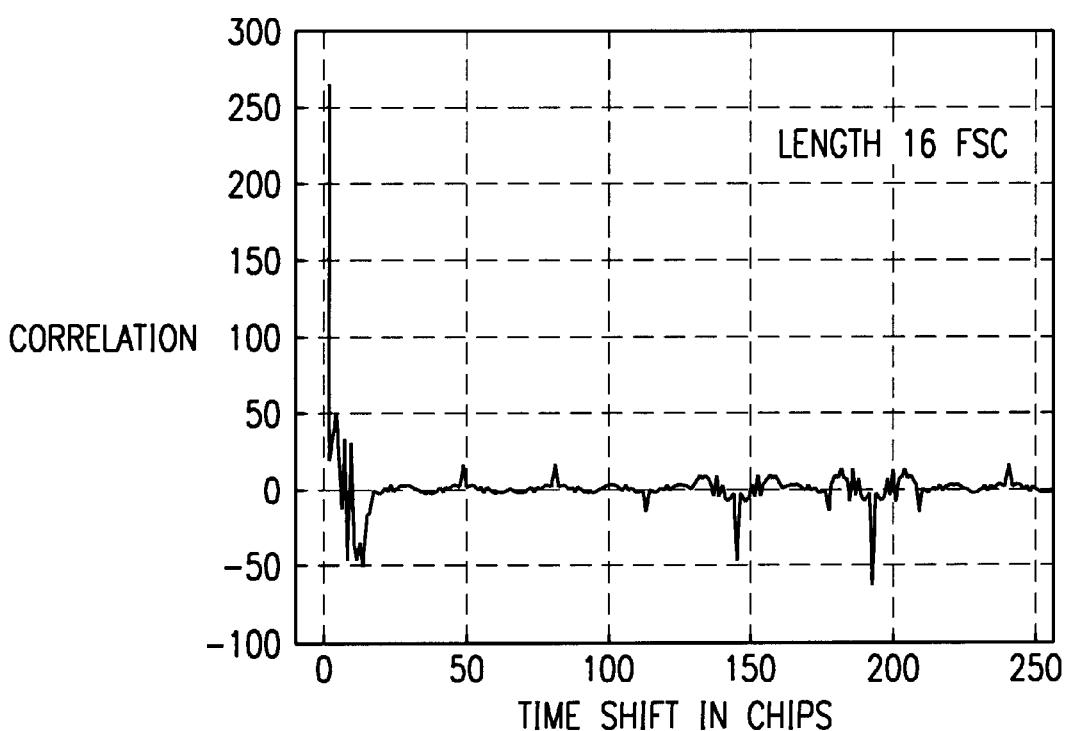
FIG. 5 is a correlation diagram for the detection circuit of FIG. 2B.
Figure 6:
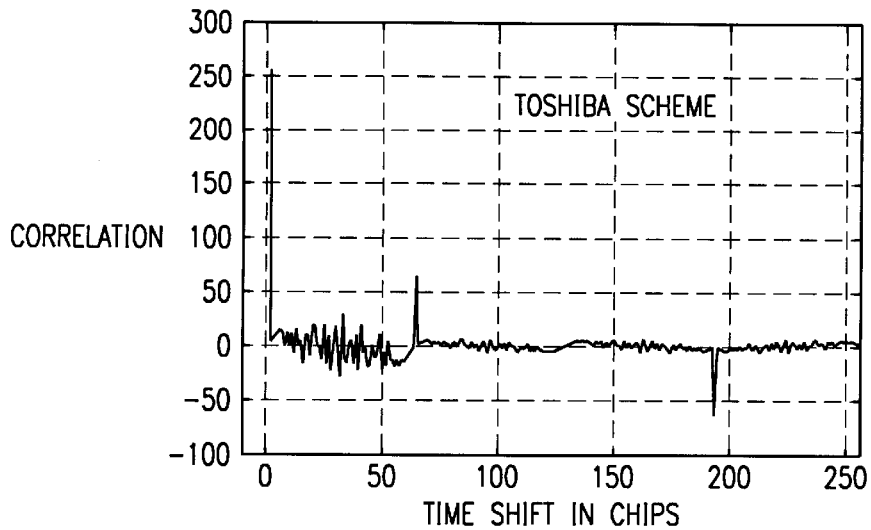
FIG. 6 is a correlation diagram for the detection circuit of FIG. 3B.

These output signals on lead 250 are loaded into serial register 291. Serial register 291 includes 240*n stages and 16 (M) taps (250, 272–280). Signal samples from the taps of serial register 291 produce 16 sample outputs in parallel. These tap signals are selectively inverted as previously described and summed by adder circuit 282 to produce a match signal MAT at lead 288. A coincidence of each chip of the received FSC symbol with the Gold PN sequence at zero time shift (FIG. 5) shows the same high correlation of all 256 chips as the embodiment of FIG. 1B in FIG. 4. Furthermore, the rejection for any shift in the received chips of the FSC symbol with respect to the Gold PN sequence also results in a comparable degradation. This embodiment of the present invention provides a further advantage of circuit simplicity and corresponding power reduction over the embodiment of FIG. 1B. The instant embodiment requires only 16 taps and 16 corresponding XOR circuits for the 16-chip accumulator circuit 220. Furthermore, the adder circuit 248 sums only 16 signals to produce the output signal on lead 250. A summary of significant features of the present invention compared to the prior art circuit of FIG. 3B is given in Table 1.

TABLE 1

|  | FIG. 1B | | FIG. 2B | | FIG. 3B (Prior Art) | |
| --- | --- | --- | --- | --- | --- | --- |
|  | 32-chip Accum. | 8-symb. Accum. | 16-chip Accum. | 16-symb. Accum. | 64-chip Accum. | 4-symb. Accum. |
| Register stages | 31*n | 224*n | 15*n | 240*n | 63*n | 192*n |
| Register taps | 32 | 8 | 16 | 16 | 64 | 4 |
| XOR gates | 32 | 0 | 16 | 0 | 64 | 0 |
| Adder length | 32 | 8 | 16 | 16 | 64 | 4 |

The comparison of Table 1 illustrates that both embodiments of the present invention as well as the prior art have a comparable number of register stages and a corresponding delay as determined by the 256-cycle Hadamard sequence. Both embodiments of FIGS. 1B and 2B, however, provide a significant reduction in register taps, XOR gates and adder length. This reduction in circuit complexity and corresponding reduction in power consumption are highly advantageous in a mobile communication system where circuit complexity and power consumption are critical factors.

Although the invention has been described in detail with reference to its preferred embodiment, it is to be understood that this description is by way of example only and is not to be construed in a limiting sense. For example, the detection circuit design need not correspond to the transmitter circuit design. The detection circuit of FIG. 2B may be used with the transmitter of FIG. 1A or FIG. 3A. When used with the transmitter of FIG. 1A, the 16-symbol accumulator circuit 290, would detect eight symbols as sixteen half symbols and two inverters such as inverter 285 would be necessary for each pair of taps corresponding to an inverted symbol. Likewise, four adjacent taps of the detection circuit of FIG. 2B would detect one symbol from the transmitter of FIG. 3A. In each case the PN sequence applied to the chip accumulator 220 would correspond to an appropriate part of the transmitted sequence. Furthermore, novel concepts of the present invention are not limited to the Gold PN sequence and extend to other sequences known to those of ordinary skill in the art such as the Lindner sequence. Moreover, applicants have discovered three other 16-cycle sequences shown below that are highly advantageous in combination with other features of the present invention. These sequences W, X and Y as given below are compared with the Lindner sequence and the Gold sequence in Table 2.

TABLE 2

| Correlation | W | X | Y | Lindner | Gold |
| --- | --- | --- | --- | --- | --- |
| Max. Side | 32 | 34 | 48 | 34 | 18 |
| Avg. Side | 5.24 | 3.90 | 2.45 | 4.04 | 5.50 |

W = {−1,−1,1,1,1,1,1,−1,1,1,−1,1,−1,1,−1,−1}
X = {1,1,1,1,1,−1,−1,1,1,−1,−1,1,1,−1,1,−1,−1}
Y = {1,1,1,1,1,−1,−1,1,1,1,−1,1,1,1,−1,−1,1,1,−1}

Figure 7:
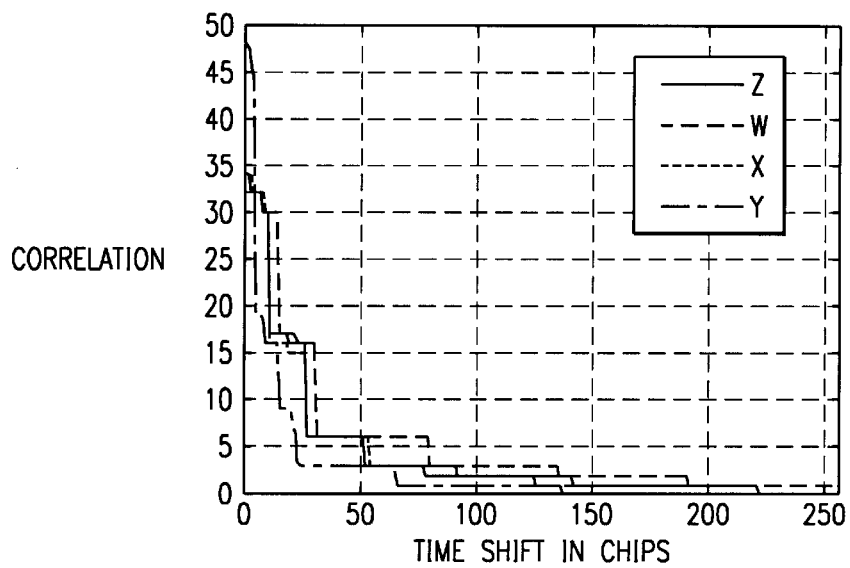
FIG. 7 is a correlation diagram for the Lindner sequence Z compared to the W, X and Y sequences of the present invention.

Referring now to FIG. 7, sequences W, X and Y will be compared to the Lindner sequence with reference to Table 2. The horizontal axis of FIG. 7 depicts time shift in chips from an ideal match. The vertical axis depicts correlation of symbols. The correlation of an exact match, corresponding to zero shift in chips, is omitted so that the vertical scale may be adjusted for other time shift values. The maximum side correlation for sequence X, for example, is 34 with an average side correlation of 3.90. This slightly better than the average side correlation of 4.04 of the Lindner sequence with the same maximum side correlation. Alternatively, the average side correlation of sequence Y (2.45) is much better than the Lindner sequence, but the maximum side correlation of 48 is worse.

Figure 8:
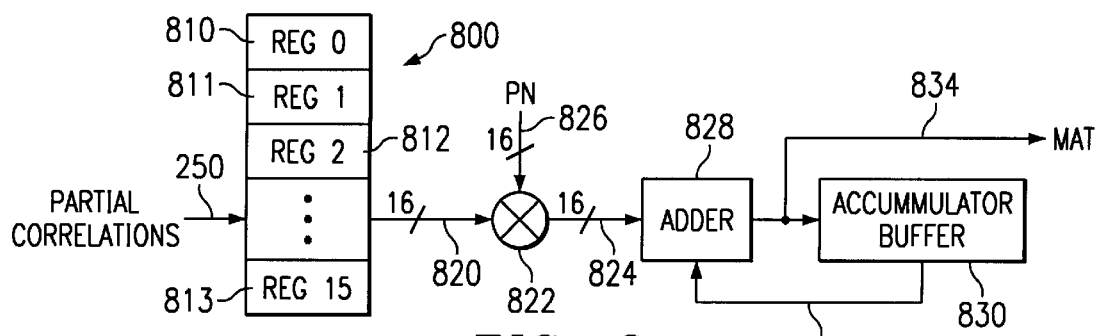
FIG. 8 is a block diagram of another embodiment of a 16-symbol accumulator circuit that may be used with the detection circuit of FIG. 2B.

Referring now to FIG. 8, there is a block diagram of another embodiment of a 16-symbol accumulator circuit that may be used with the detection circuit of FIG. 2B. The accumulator circuit is coupled to receive partial correlation signals on lead 250 from adder circuit 248 (FIG. 2B). Serial circuit 800 includes a bank of registers 810–813 arranged to receive respective samples of the serial data. Data from each register is applied to logic circuit 822 via bus 820. A PN code applied to logic circuit 822 via bus 826 selectively inverts the data signals in a manner similar to the function of inverter 285 (FIG. 2B). An adder receives each signal on bus 824 and adds it to the accumulated result on lead 832. The result is stored in accumulator-buffer circuit 830. A final addition produces a match signal MAT on lead 834. This register-accumulator circuit is highly advantageous in efficient processing serial data. Moreover, it offers programmable flexibility of register length and PN code selection. This serial circuit may be used in lieu of any of the previously described serial circuits. Other embodiments of serial circuits such as circular buffers, addressable memory, shift registers and digital signal processors may be adapted to the present invention as will be appreciated by those of ordinary skill in the art having access to the instant specification.

It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed is:

1. A circuit for detecting a signal, comprising:
   first circuit arranged to produce a first sequence of M groups, each group having N logical signals, wherein each of a first plurality of the M groups have a predetermined sequence and wherein each of a second plurality of the M groups is a ones complement of the predetermined sequence;
   a second circuit arranged to produce a second sequence of logical signals, wherein a number of the second sequence of logical signals is equal to a product of M and N; and
   a third circuit coupled to receive the first and second sequences, the third circuit producing a match signal in response to the first and second sequences.

2. A circuit as in claim 1, wherein the predetermined sequence of the first plurality of the M groups is a Gold sequence.

3. A circuit as in claim 1, wherein the second sequence is a Hadamard sequence.

4. A circuit as in claim 1, wherein M is 8 and N is 32.

5. A circuit as in claim 1, wherein M is 16 and N is 16.

6. A circuit as in claim 1, said third circuit producing a match signal includes producing a logical XOR of each signal from the first sequence with each signal from the second sequence.

7. A circuit as in claim 1, wherein the match signal is a first search code signal.

8. A circuit as in claim 1, wherein each of the first and second circuits comprise shift registers.

9. A circuit for detecting a signal, comprising:
   a first serial circuit coupled to receive an input signal in response to a clock signal, the first serial circuit having N taps arranged to produce a respective plurality of first tap signals from the input signal;
   a first logic circuit coupled to receive the plurality of first tap signals and one of N predetermined signals and the complement of N predetermined signals, the first logic circuit producing a first output signal in response to the clock signal, the plurality of first tap signals and the one of N predetermined signals and the complement of N predetermined signals;
   a second serial circuit coupled to receive the first output signal, the second serial circuit having M taps arranged to produce a respective plurality of second tap signals from the first output signal, wherein a ratio of N/M is no greater than four; and
   a second logic circuit coupled to receive one of a true and a complement of each of the plurality of second tap signals, the second logic circuit producing a second output signal in response to the one of a true and a complement of each of the plurality of second tap signals.

10. A circuit as in claim 9, wherein the input signal is a Hadamard sequence.

11. A circuit as in claim 10, wherein the N predetermined signals is a Gold sequence.

12. A circuit as in claim 9, wherein the N predetermined signals is one of a Lindner sequence, a W sequence, an X sequence and a Y sequence.

13. A circuit as in claim 9, wherein M is 8 and N is 32.

14. A circuit as in claim 9, wherein M is 16 and N is 16.

15. A circuit as in claim 9, wherein the second output signal is a match signal, the match signal having a value at least twice another value of the second output signal in response to a substantial match between the input signal and the N predetermined signals.

16. A circuit as in claim 15, wherein the match signal corresponds to a first search channel signal.

17. A circuit as in claim 16, wherein each of the first and second serial circuits is a shift register.

18. A circuit as in claim 17, wherein each of the first and second serial circuits further comprises an integral multiple of n stages between each respective tap.

19. A circuit as in claim 9, wherein the first logic circuit further comprises:
   a plurality of N logic gates coupled to receive the N predetermined signals and the plurality of first tap signals, the logic gates producing a respective plurality of N logic signals;
   an first adder circuit coupled to receive the N logic signals, the adder circuit producing the first output signal.

20. A circuit as in claim 19, wherein the second logic circuit further comprises a second adder circuit coupled to receive the one of a true and a complement of each of the plurality of second tap signals.

21. A circuit for detecting a signal, comprising:
   a first serial circuit coupled to receive an input signal in response to a clock signal, the first serial circuit having N taps arranged to produce a respective plurality of first tap signals from the input signal;
   a first logic circuit coupled to receive the plurality of first tap signals and a plurality of N predetermined signals, the first logic circuit producing a first output signal in response to the plurality of first tap signals and the N predetermined signals;
   a second serial circuit coupled to receive the first output signal, the second serial circuit having M taps arranged to produce a first plurality of samples of the first output signal and a second plurality of complements of samples of the first output signal; and
   a second logic circuit coupled to receive the first plurality of samples and the second plurality of complements of samples, the second logic circuit producing a second output signal in response to a logical combination of the first plurality of samples and the second plurality of complements of samples.

22. A circuit as in claim 21, wherein the input signal is a Hadamard sequence.

23. A circuit as in claim 21, wherein the N predetermined signals is a Gold sequence.

24. A circuit as in claim 21, wherein the N predetermined signals is one of a Lindner sequence, a W sequence, an X sequence and a Y sequence.

25. A circuit as in claim 21, wherein M is 8 and N is 32.

26. A circuit as in claim 21, wherein M is 16 and N is 16.

27. A circuit as in claim 21, wherein the second output signal is a match signal, the match signal having a value at least twice another value of the second output signal in response to a substantial match between the input signal and the N predetermined signals.

28. A circuit as in claim 27, wherein the match signal corresponds to a first search channel signal.

29. A circuit as in claim 28, wherein each of the first and second serial circuits is a shift register.

30. A circuit as in claim 29, wherein each of the first and second serial circuits further comprises an integral multiple of n stages between each respective tap.

31. A circuit as in claim 21, wherein the first logic circuit further comprises:
   a plurality of N logic gates coupled to receive the N predetermined signals and the plurality of first tap signals, the logic gates producing a respective plurality of N logic signals;
   an first adder circuit coupled to receive the N logic signals, the adder circuit producing the first output signal.

32. A circuit as in claim 31, wherein the second logic circuit further comprises a second adder circuit coupled to receive the one of a true and a complement of each of the plurality of second tap signals.

33. A method of detecting a signal at a mobile communication system, comprising the steps of:
   receiving an input signal from a remote transmitter;
   sampling M groups of N signals each from the input signal in response to a clock signal;
   comparing the N signals of each group to one of a predetermined sequence of signals and a complement of the predetermined sequence of signals;
   producing a plurality of M signals in response to the comparing step of each respective group;
   producing a match signal in response to the plurality of M signals.

34. A method as in claim 33, wherein the step of receiving includes receiving the input signal having a Hadamard sequence.

35. A method as in claim 33, wherein the step of sampling includes the steps of:
   determining a plurality of values of the input signal at respective periodic times in response to the clock signal; and
   storing each value in a shift register.

36. A method as claim 33, wherein the step of comparing includes:
   producing N logic signals in response to a respective logical combination of the N predetermined signals and the N signals;
   adding the N logic signals; and
   producing one of M signals in response to the step of adding.

37. A method as claim 33, wherein the step of producing a match signal includes: adding one of a true and a complement of each of the plurality of M signals; and producing the match signal in response to the step of adding.

* * * * *